United States Patent
Kwon et al.

(10) Patent No.: US 9,635,701 B2
(45) Date of Patent: Apr. 25, 2017

(54) METHOD FOR DETERMINING LINK QUALITY IN WIRELESS NETWORK SYSTEM

(71) Applicant: Korea Electronics Technology Institute, Gyeonggi-do (KR)

(72) Inventors: Tai Gil Kwon, Goyang-si (KR); Jin Woong Cho, Seoul (KR); Yong Seong Kim, Goyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 94 days.

(21) Appl. No.: 14/679,179

(22) Filed: Apr. 6, 2015

(65) Prior Publication Data

US 2016/0226606 A1    Aug. 4, 2016

(30) Foreign Application Priority Data

Feb. 4, 2015  (KR) ........................ 10-2015-0017337

(51) Int. Cl.
*H04W 84/20* (2009.01)
*H04W 24/06* (2009.01)
*H04W 76/04* (2009.01)
*H04W 40/24* (2009.01)

(52) U.S. Cl.
CPC ....... *H04W 76/045* (2013.01); *H04W 40/244* (2013.01); *H04W 84/20* (2013.01)

(58) Field of Classification Search
CPC  H04B 17/309; H04W 40/244; H04W 76/045; H04W 24/06; H04W 84/20
See application file for complete search history.

(56) References Cited

U.S. PATENT DOCUMENTS

| 8,504,889 B2 | 8/2013 | Husted et al. | |
| 2002/0022495 A1* | 2/2002 | Choi | H04W 52/265 455/522 |
| 2004/0166864 A1* | 8/2004 | Hill | H04W 36/0055 455/450 |
| 2008/0232393 A1* | 9/2008 | Dharmaraju | H04W 84/20 370/453 |

(Continued)

FOREIGN PATENT DOCUMENTS

| KR | 10-2005-0119156 A | 11/2010 |
| KR | 10-2012-0005135 A | 1/2012 |
| KR | 10-2013-0098402 A | 9/2013 |

OTHER PUBLICATIONS

Korean Intellectual Property Office, Communication dated Apr. 7, 2016 issued in corresponding Korean Application No. 10-2015-0017337.

*Primary Examiner* — Brian D Nguyen
(74) *Attorney, Agent, or Firm* — Sughrue Mion, PLLC

(57) ABSTRACT

Provided is a method for determining network link quality between a master station and slave stations in a wireless network system having a synchronous superframe structure. The method for determining link quality in a wireless network system includes determining whether the current station is a master or a slave, when the current station is a master, comparing a time value during which the latest packets were received from slaves and a maximum time value during which the slaves are not obliged to exchange packets with the master after accessing a network, and determining link quality between the slaves and the master according to the comparison result.

6 Claims, 10 Drawing Sheets

(56) References Cited

U.S. PATENT DOCUMENTS

2014/0188348 A1* 7/2014 Gautama ............... B60W 10/30
                                                      701/48
2014/0247744 A1* 9/2014 Agiwal ................ H04W 28/16
                                                     370/252
2014/0341108 A1* 11/2014 Desai et al. .......... H04L 5/0032
                                                     370/328
2014/0351359 A1* 11/2014 Grocutt .................... G06F 1/12
                                                     709/209

* cited by examiner

METHOD FOR DETERMINING LINK QUALITY IN WIRELESS NETWORK SYSTEM

CROSS-REFERENCE TO RELATED APPLICATIONS

This application claims priority under 35 U.S.C. §119 to Korean Patent Application No. 10-2015-0017337, filed on Feb. 4, 2015, the disclosure of which is incorporated herein by reference in its entirety.

TECHNICAL FIELD

The present invention relates to a method for determining link quality in a wireless network system and, more particularly, to a method for determining network link quality between a master station and slave stations in a wireless network system in which communication is performed using a synchronous superframe structure.

BACKGROUND

Some elements constituting a personal wireless network as illustrated in FIG. 1 may be considered. The most basic element is a station. Here, FIG. 1 is a view illustrating connection relationships between stations in a general personal wireless network system.

In general, a piconet is established when two or more stations operating in the same radio frequency channel exist within a personal activity area.

Stations are classified as a master M and slaves S1, S2, S3, and S4 depending on roles thereof.

The master M manages the entirety of the piconet and only one master may exist in the piconet. The master M controls the slaves S1, S2, S3, and S4 by broadcasting beacons to the plurality of slaves S1, S2, S3, and S4.

The slaves S1, S2, S3, and S4 may transmit and receive data under the management of the master M. In general, the master M internally has information of the slaves S1, S2, S3, and S4, and thus, when the slaves S1, S2, S3, and S4 are connected to the master M, the master M performs communication using the information of the slaves S1, S2, S3, and S4. Here, a structure of a superframe transmitted and received between the master M and the slaves S1, S2, S3, and S4 is as illustrated in FIG. 2.

As illustrated in FIG. 2, the structure of a superframe includes a beacon period, a contention period, and a data allocation period, and length so the periods are variable.

During the beacon period, the master transmits a beacon packet including network reference information to the slaves.

During the contention period, the slaves and the master transmit and receive a command packet such as a network join request/separation request/permission, a resource allocation request/permission, a connection request/permission, and the like, in a random access manner. Here, during the contention period, exclusive access to a medium through an exclusive allocation by the master is not guaranteed, and thus, each station (the master and the slaves) access a medium by using a carrier sense multiple access/collision avoidance (CSMA/CA).

During the data allocation period, each station exclusively accesses a medium during a time slot distributed to each station. The master distributes a time slot of the data allocation period to each station by using a time division multiple access (TDMA) scheme. Here, each station may exclusively access the medium during the distributed time slot, and each station may transmit and receive data to and from other station in a one-to-one correspondence manner, without intervention of the master, during the allocated time slot.

FIG. 2 illustrates a structure of a superframe of data allocation periods with respect to slaves S1 to S4 when a data allocation period of the master is M and the overall number of the slaves is 4 (S1 to S4).

In the wireless network system, when the master M and the slaves S1 to S4 perform communication, communication may be interrupted for a long period of time for various reasons such as radio interference between the master M and the slaves S1 to S4, propagation cutoff due to an obstacle, defective hardware, and the like, in many cases.

FIG. 3 is a view illustrating an example in which a radio link between the master station M and the slave stations S1, S2, S3, and S4 is disconnected in a personal wireless network system.

In a case in which the wireless network is disconnected as illustrated in FIG. 3, the master M may consider that there is no data for the slaves S1, S2, S3, and S4 to transmit to the master M so slave data is not received, and thus, the master M may not discriminate whether there is a problem with a link physically or whether the slaves S1, S2, S3, and S4 have no data to be transmitted for a long period of time.

Similarly, the slaves S1, S2, S3, and S4 receive beacons from the master M so the slaves S1, S2, S3, and S4 are synchronized with the master M, but, here, beacons are received even when data is not properly transmitted and received, and thus, the slaves S1, S2, S3, and S4 continue to request transmission from the master M.

Thus, even though there is a problem with a link physically between the master M and the slaves S1, S2, S3, and S4, the master M continues to wait to receive beacon signals from the slaves S1, S2, S3, and S4, and in addition, when the number of slaves increases in a state in which the master M stores information of the slaves S1, S2, S3, and S4 which have already been interrupted in communication, other slaves may lose an opportunity for accessing a network, increasing a waste of memory resource.

Also, the slaves S1, S2, S3, and S4 are supposed to be synchronized with the master M through reception of beacons to transmit and receive data, and here, if data transmission is not properly performed, the slaves S1, S2, S3, and S4 need to recognize the corresponding situation quickly and overcome the limitation or need to search for any other appropriate master nearby to access the network.

SUMMARY

Accordingly, the present invention provides a link quality determining method for effectively determining whether a physical link between a master station and slave stations has an error by monitoring network link quality between the master station and the slave stations in real time in a wireless network system in which communication is performed using a synchronous superframe structure In one general aspect, a method for determining link quality in a wireless network system includes: determining whether the current station is a master or a slave; when the current station is a master, comparing a time value during which the latest packets were received from slaves and a maximum time value during which the slaves are not obliged to exchange packets with the master after accessing a network; and determining link quality between the slaves and the master according to the comparison result.

The determining of link quality may include: when the time value during which the latest packets were received from the slaves is greater than the maximum time value during which the slaves are not obliged to exchange packets with the master after accessing the network, determining that a link between a corresponding slave and the master has an error and disconnecting, by the master, a corresponding slave from the network; and deleting information regarding the corresponding disconnected slave.

The method may further include: when the current station is a slave, determining whether the number of times of failing to continually receive a beacon signal from the master is 0; when the number of times of failing to continually receive a beacon signal from the master is 0, determining whether the time value during which the latest packet was received from the master is greater than a threshold time with respect to the maximum time value during which the slave is not obliged to exchange packets with the master after accessing the network; when it is determined that the time value during which the latest packet was received from the master is greater than the threshold time with respect to the maximum time value during which the slave is not obliged to exchange packets with the master after accessing the network, transmitting, by the slave, a command indicating that the slave has been activated, to the master; determining whether the time value during which the latest packet was received from the master is greater than the maximum time value during which the slave is not obliged to exchange packets with the master after accessing the network, after the transmitting of a command; and when it is determined that the time value during which the latest packet was received from the master is greater than the maximum time value during which the slave is not obliged to exchange packets with the master after accessing the network, determining that there is an error with the link to the master and notifying about disconnection to the master.

When the number of times of failing to continually receive a beacon signal from the master is not 0 and the time value during which the latest packet was received from the master is smaller than the threshold time with respect to the maximum time value during which the slave is not obliged to exchange packets with the master after accessing the network, a link state with the master may be determined by determining whether the time value during which the latest packet was received from the master is greater than the maximum time value during which the slave is not obliged to exchange packets with the master after accessing the network.

The method may further include: when the time value during which the latest packet was received from the master is smaller than the maximum time value during which the slave is not obliged to exchange packets with the master after accessing the network, determining whether a beacon transmission time value of the master is greater than the maximum time value during which the slave is not obliged to exchange packets with the master; and when it is determined that the beacon transmission time value of the master is greater than the maximum time value during which the slave is not obliged to exchange packets with the master, determining that a beacon has not been received continually from the master for a long period of time so a link has been disconnected, and resetting an operation of the slave.

The method may further include: re-connecting to a previous master or requesting a connection to a new master of other channel, after the resetting of the slave.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the specification, like numbers refer to like elements.

In describing embodiments of the present invention, a detailed description of known techniques associated with the present invention unnecessarily obscure the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, a method for determining link quality in a wireless network system according to embodiments of the present invention will be described in detail with reference to the accompanying drawings.

Figure 4:
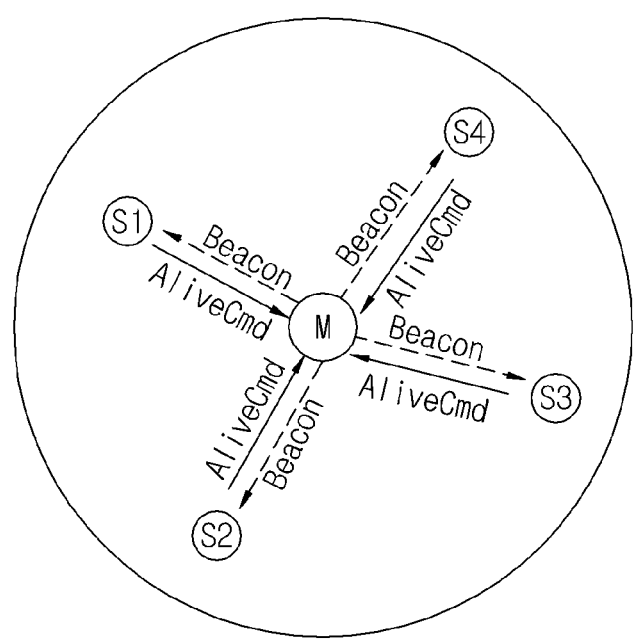
FIG. 4 is a view illustrating an example of a process of transmitting and receiving beacons and alive commands (AliveCmd) between the master station and the slave stations in the personal wireless network system.
Figure 5:
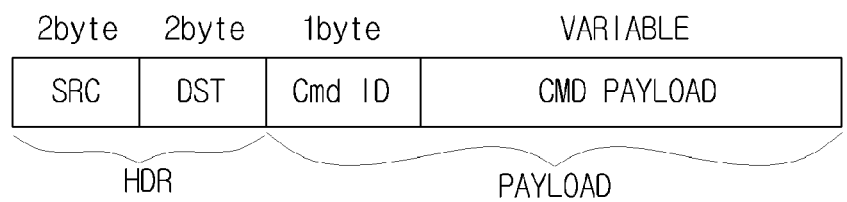
FIG. 5 is a view illustrating a structure of a command frame transmitted from the slave stations to the master station in the personal wireless network system.
Figure 6:
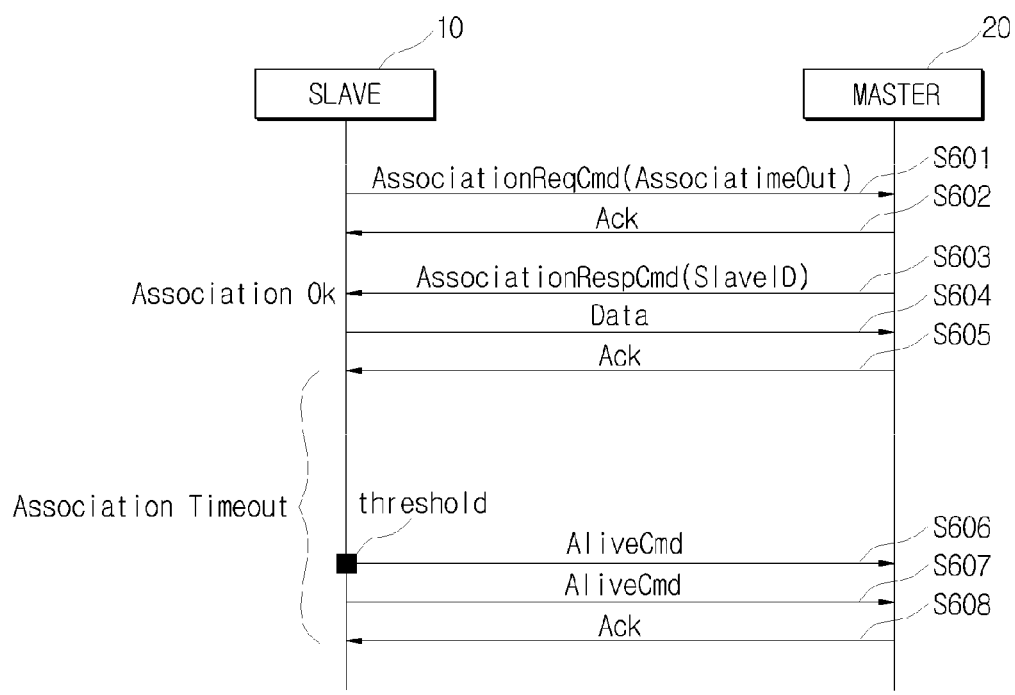
FIG. 6 is a view illustrating a process of transmitting an alive command (AliveCmd) from a slave station to the master station in the personal wireless network system.
Figure 7:
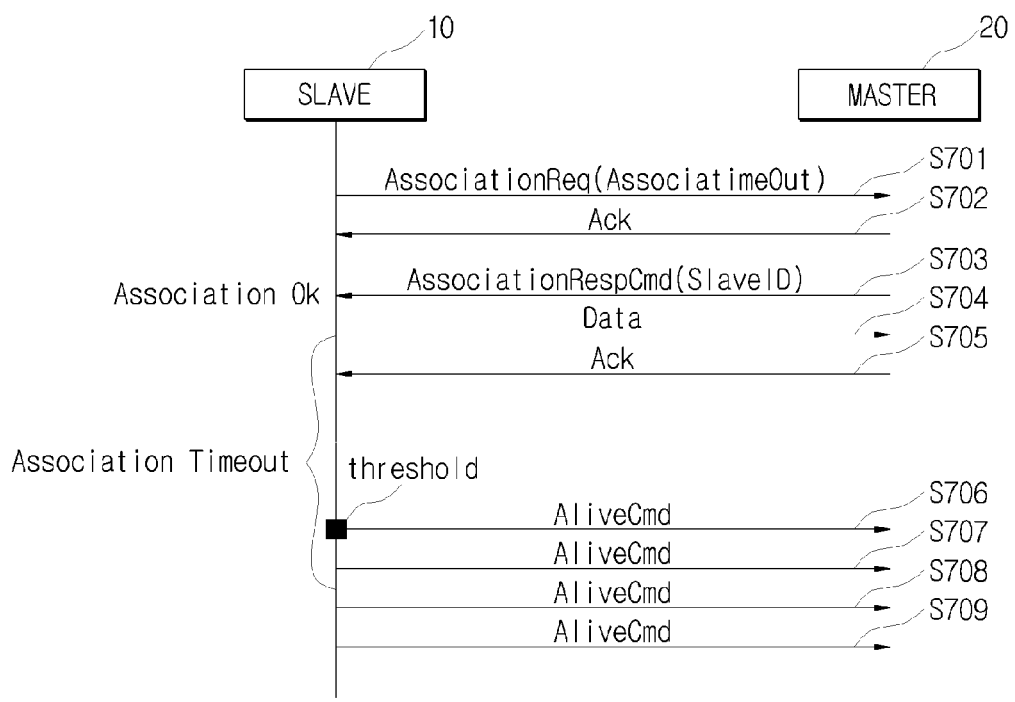
FIG. 7 is a view illustrating an example of a process in which acknowledgement (ACK) with respect to an alive command (AliveCmd) transmitted from a slave station to the master station fails to receive from the master station in FIG. 6.

FIG. 4 is a view illustrating an example of a process of transmitting and receiving beacons and alive commands (AliveCmd) between the master station and the slave stations in the personal wireless network system, FIG. 5 is a view illustrating a structure of a command frame transmitted from the slave stations to the master station in the personal wireless network system, FIG. 6 is a view illustrating a process of transmitting an alive command (AliveCmd) from a slave station to the master station in the personal wireless network system, and FIG. 7 is a view illustrating an example of a process in which acknowledgement (ACK) with respect to an alive command (AliveCmd) transmitted from a slave station to the master station fails to receive from the master station in FIG. 6.

Figure 1:
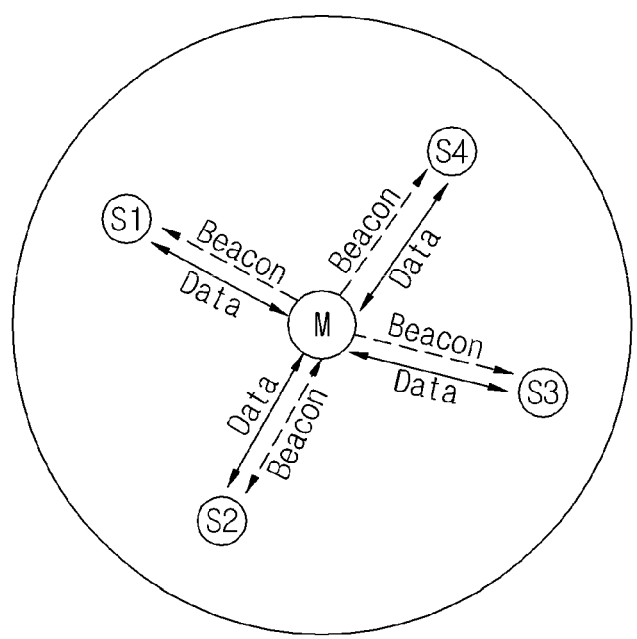
FIG. 1 is a view illustrating a connection relationship among stations in a general personal wireless network system.
Figure 2:
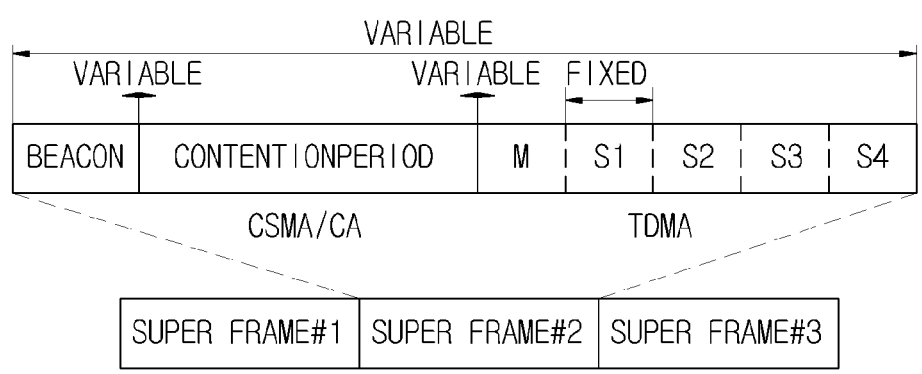
FIG. 2 is a view illustrating a structure of a superframe transmitted and received between a master station and slave stations in the general personal wireless network system.
Figure 3:
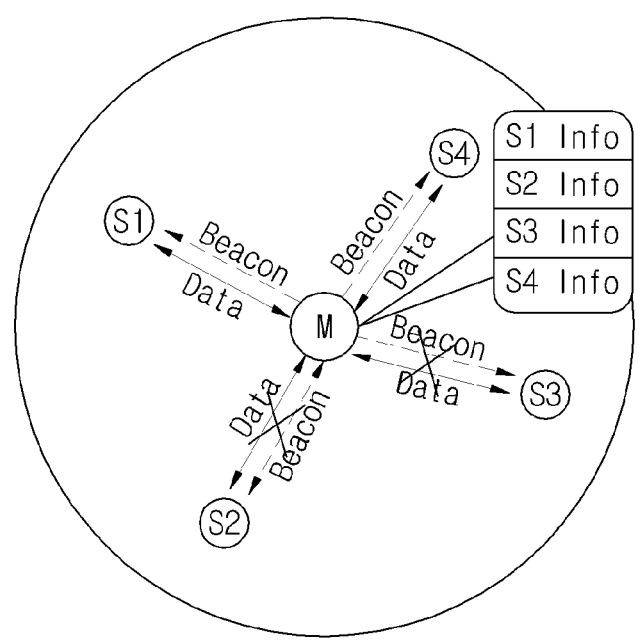
FIG. 3 is a view illustrating an example of a state in which radio links between the master station and the slave stations are disconnected in the personal wireless network system.

First, as illustrated in FIG. 4, in order to determine whether a physical link between a master M and slaves S1, S2, S3, and S4, the slaves S1, S2, S3, and S4 transmit AliveCmd to the master M periodically (Association TimeOut). Here, the AliveCmd is transmitted during a contention period (CSMA/CA), rather than during a data period (TDMA) in the superframe structure illustrated in FIG. 2. Here, the AliveCmd frame type transmitted during the contention period may be divided into a header hdr and a payload as illustrated in FIG. 5.

As illustrated in FIG. 5, the header hdr may include a transmission address (SRC) region and a reception DST region, and the payload may include a Cmd ID region and a Cmd payload region.

An AliveCmd command includes an address of a slave in the transmission address SRC region of the header and a master address in the reception address DTY region. Here, the master address is fixe to 0 all the time, the Cmd ID is a unique value not duplicated with other Cmd ID, and Cmd payload is not required.

A process of transmitting AliveCmd from a slave 10 to a master 20 will be described with reference to FIG. 6.

First, the slave 10 transmits a network access request (AssociationReqCmd) to the master 20 in step S601. Here, when transmitting the network access request (AssociationReqCmd) to the master 20, the slave 10 provides Association TimeOut information. Here, AssociationTimeOut information refers to a maximum period of time during which the slave 10 are not obliged to exchange a packet with the master 20 after connected to the network.

Subsequently, the master 20 transmits an ACK message to the corresponding slave 10 according to the access request from the slave 10, and selects a corresponding slave address SlaveID and transmits an access response command (AssociatoinRespCmd) for a data transmission request to the corresponding slave 10 in steps S602 and S603.

Thereafter, the master 20 receives data from the slave 10 in step S604, and when the data is received, the master 20 transmits an ACK message with respect to the data transmission to the corresponding slave 10 in step S605.

After the data is transmitted from the slave 10 to the master 20, if data transmitted from the slave 10 to the master 20 does not exist for a long period of time, the slave 10 transmits AliveCmd after a particular time (AssociationTimeOut-threshold) in order to inform the master 20 that the slave 10 is normally activated in steps S606 and S607.

Subsequently, when a reception acknowledgement Ack message is received according to the transmission of AliveCmd, the slave 10 stops transmission of AliveCmd in step S608. Here, the threshold of a particular time at which the AliveCmd is transmitted is flexible depending on AssociationTimeOut and the number of maximum accesses of the maximum number of slaves.

In FIG. 6, when the slave 10 fails to receive the reception acknowledgement Ack message with respect to AliveCmd from the master 20, the slave 10 continually transmits AliveCmd to the master 20 periodically as illustrated in FIG. 7 in steps S708 and S709. Here, operations in steps S701 to S707 are the same as those of steps S601 to S607, and thus, detailed descriptions of the operations will be omitted An operation for determining a state of a link when a data is transmitted and received between the slave and the master will be described by stages with reference to FIG. 8.

Figure 8:
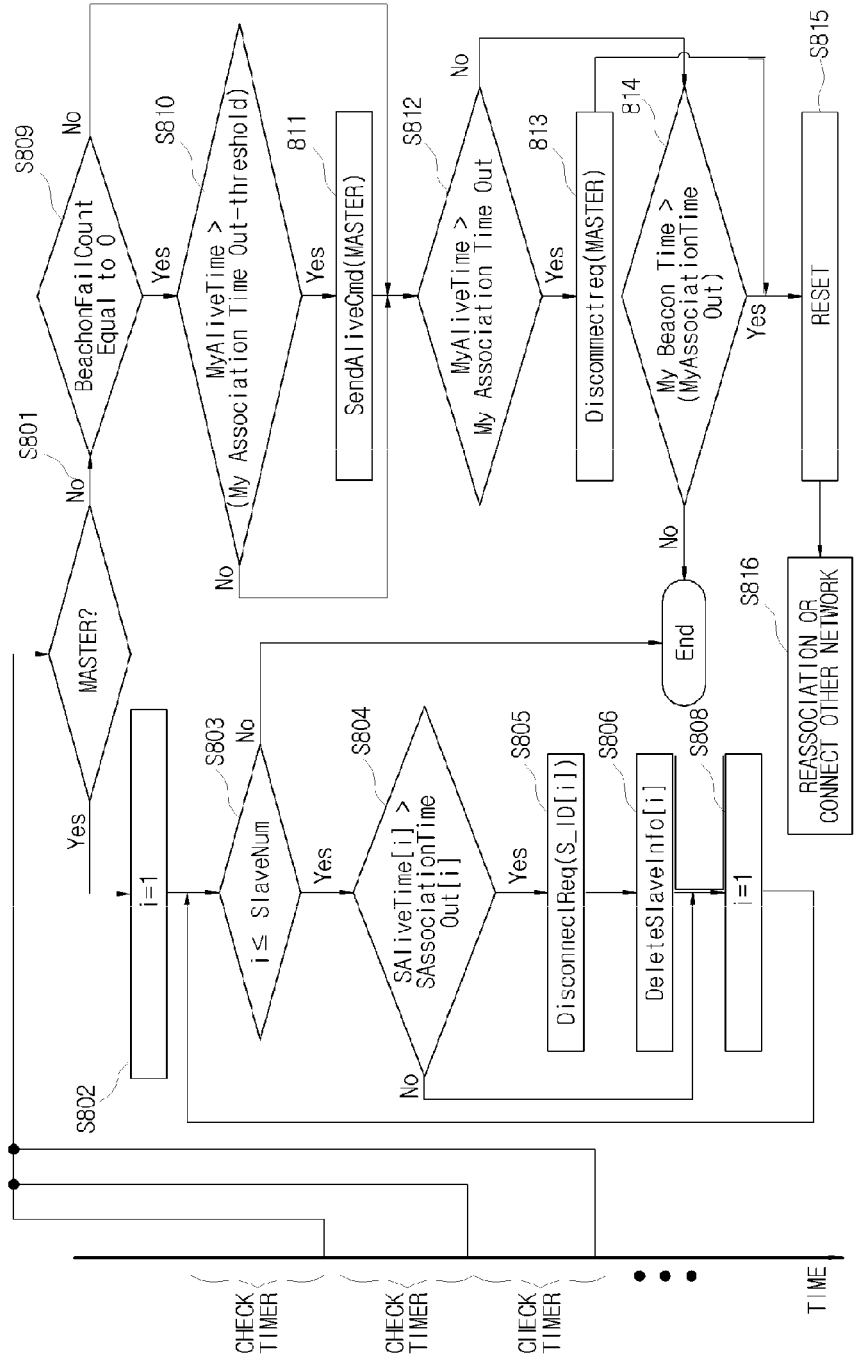
FIG. 8 is a flow chart illustrating an operation of a method for determining link quality in a wireless network system according to an embodiment of the present invention.

FIG. 8 is a flow chart illustrating an operation of a method for determining link quality in a wireless network system according to an embodiment of the present invention. That is, FIG. 8 shows an algorithm for determining whether network links between one master and several slaves are normal or defective, and such an algorithm determines quality of the network links periodically at every predetermined time CheckTimer.

As illustrated in FIG. 8, first, it is determined whether the current station is a master or a slave in step S801.

When the corresponding station is a master according to the determination, AliveTime and AssociationTimeOut of a first slave stored in the master are compared in steps S802, S803, and S804. Here, AliveTime is a time value at which the latest packets (data, command) were received from the slaves, and AssociationTimeOut is a maximum period of time during which the slaves are not obliged to exchange packets with the master after connected to the network. AssociationTimeOut is informed to the master when the slaves are connected to the network, and this value may be different between slaves.

When AliveTime of a first slave is greater than AssociationTimeOut in step S804, the master determines that there is a problem with a link between the slave and the master, and releases the connection of the corresponding slave from the network in step S805. That is, when it is determined that there is a problem with a link with the slave, the master transmits DisconnectReq to the corresponding first slave to notify about the release connection thereof to the network.

After releasing the connection of the slave, the master deletes information of the corresponding slave such that other slaves may reuse the information in step S806.

After the step S806, the master performs the foregoing operation in the same manner on every other slaves connected to the network to determine a link state of each slave.

If, however, AliveTime of the first slave is equal to or smaller than AssociationTimeOut, the master determines that there is no problem with link quality of the first slave and performs an operation of determining a state of link quality with respect to a second slave, such as steps S804 to S806.

In this manner, the same process is performed on every slave connected to the master to recognize network link quality of all of the master and the slaves.

When the corresponding station is a slave, rather than being a master in step S801, the slave determines whether BeaconFailCount is 0 in step S809. Here, BeaconFailCount indicates the number of times that the slave continually fails to receive a beacon from a master.

When BeaconFailCount is 0 according to the determination result in step S809, the slave determines whether AliveTime of the master is greater than AssociationTimeOut-threshold in step S810.

When BeaconFailCount is not 0, step S812 is performed.

When AliveTime of the master is greater than AssociationTimeOut-threshold according to the determination result of step S810, the slave transmits AliveCmd to the master in order to inform the master that the slave (itself) has been activated in step S811.

If, however, AliveTime of the master is equal to or smaller than AssociationTimeOut-threshold, step S811 is not performed and step S812 is performed.

Subsequently, when BeaconFailCount is not 0 in step S809, if AliveTime of the master is equal to or smaller than AssociationTimeOut-threshold in step S810 and step S811 has been performed, it is determined whether AliveTime of the master is greater than AssociationTimeOut in step S812.

When AliveTime of the master is greater than AssociationTimeOut, the slave determines that a network link with the master is problematic, informs the master about network release (DisconnectReq(Master)) in step S813 and performs resetting (Reset) in step S815.

However, when AliveTime of the master is equal to or smaller than AssociationTimeOut in step S812, the slave determines whether BeaconTime of the master is greater than AssociationTimeOut in step S814.

When BeaconTime of the master is greater than AssociationTimeOut according to the determination result, the slave is in a state of have not being received a beacon continually for a long period of time from the master, and thus, the slave determines that a link has been completely disconnected and performs resetting in step S815.

However, when BeaconTime of the master is equal to or smaller than AssociationTimeOut, the slave terminates the foregoing operation.

After being reset in step S815, the slave may be connected again according to the latest network situation, or may request connection to a completely new network in step S816. For example, when a bean is received but there is a problem with a data transmission, the slave lowers a transfer rate and accesses again to the previous master, or when a beacon is not received form a long period of time, the slave determines that a network link is severely poor and attempts to access a new master of other channel.

Figure 9:
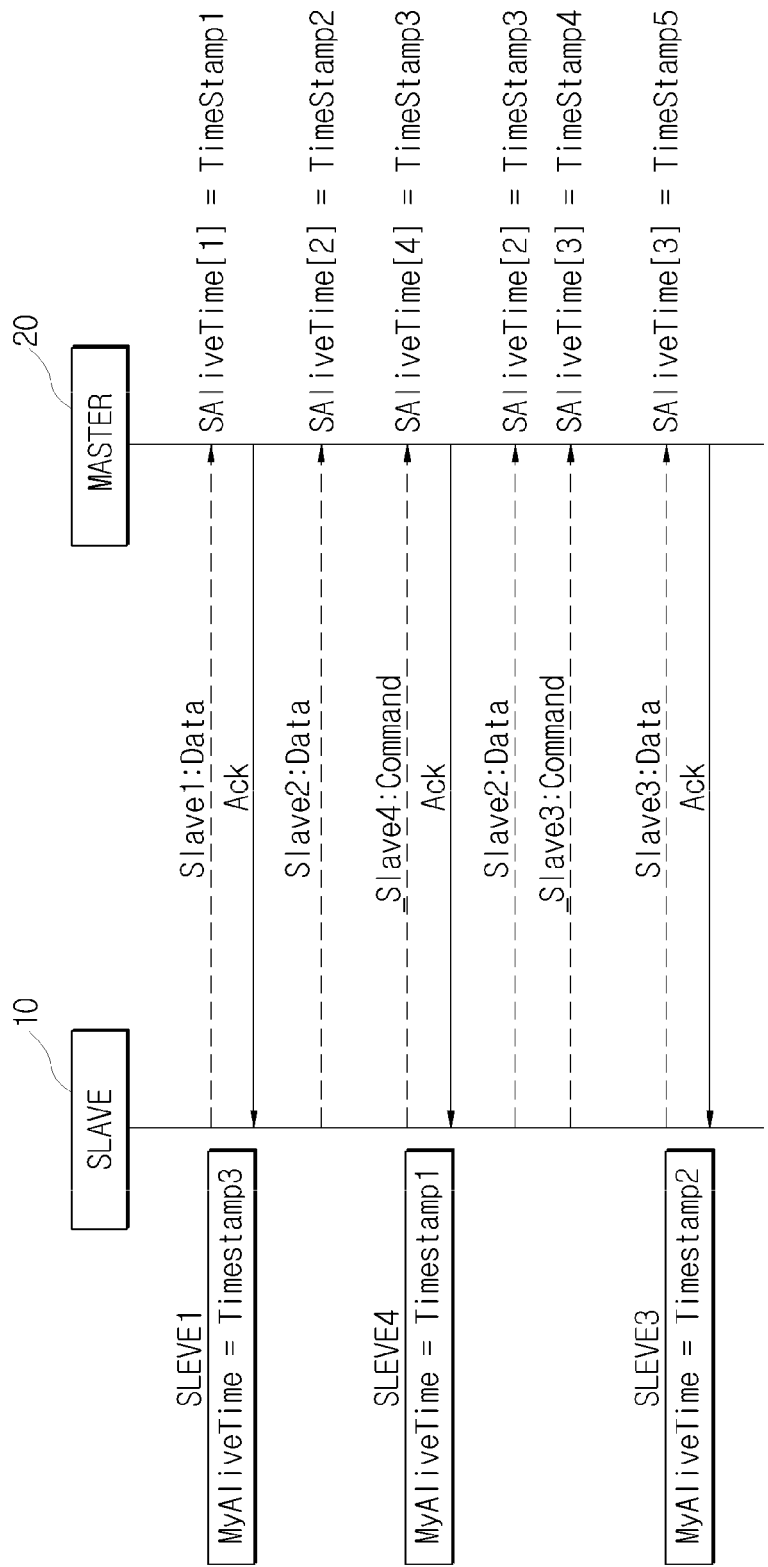
FIG. 9 is a view illustrating a timing of storing Alive-related time stamp of master and slave stations in the wireless network system.

FIG. 9 is a view illustrating TimeStamp timings stored in AliveTime of the Alive-related master AliveTime and slave AliveTime.

As illustrated in FIG. 9, as for master 20 AliveTime, TimeStamp is stored at a point in time at which a reception success acknowledgement ACK of Data, Command (AssociationReq, AliveTime, etc.) transmitted by the slave 10 is received.

As for slave 10 AliveTime, TimeStamp is stored at a point in time at which Data, Command (AssociationReq, AliveTime, etc.) received from slaves is received.

Figure 10:
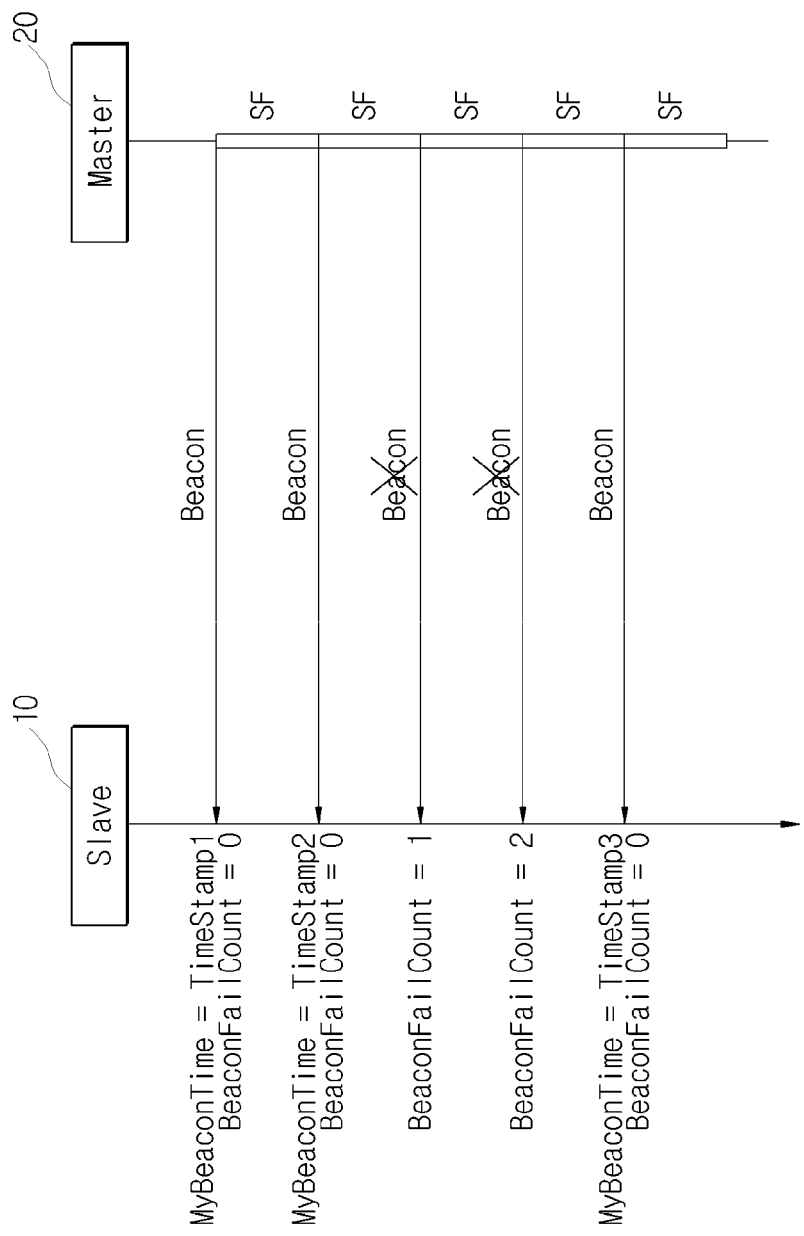
FIG. 10 is a view illustrating a timing for storing a time stamp with respect to a beacon signal transmitted from the master station to the slave station in the wireless network system.

FIG. 10 is a view illustrating a process of generating master BeaconTime and BeaconFailCount related to beacon reception.

As illustrated in FIG. 10, the master 20 BeaconTime in the slave 10 stores TimeStamp when a beacon is received from the master, and BeaconFailCount indicates the latest number when beacon reception has failed.

According to an embodiment of the present invention, since link quality between the master and several slaves is managed in real time, overall network performance may be enhanced.

Also, according to an embodiment of the present invention, a physical link disconnection and a logical link disconnection between a master and slaves may be discriminated, and a defective slave link may be quickly deleted, whereby resource of slaves within the master may be effectively managed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for determining link quality in a wireless network system, the method comprising:
   determining, by a current station, whether the current station is a master station or a slave station;
   when the current station is the master station, comparing, by the master station, a time value during which the latest packets were received from a plurality of slave stations and a maximum time value during which the plurality of slave stations are not obliged to exchange packets with the master station after accessing a network; and
   determining, by the master station, link quality between the plurality of slave stations and the master station according to a result of the comparison.

2. The method of claim 1, wherein the determining of link quality comprises:
   when the time value during which the latest packets were received from the plurality of slave stations is greater than the maximum time value during which the plurality of slave stations are not obliged to exchange packets with the master station after accessing the network, determining, by the master station, that a link between a corresponding slave of the plurality of slave stations and the master station has an error and disconnecting, by the master station, the corresponding slave from the network; and
   deleting, by the master station, information regarding the corresponding disconnected slave.

3. The method of claim 1, further comprising:
   when the current station is the slave station, determining, by the slave station, whether the number of times of failing to continually receive a beacon signal from the master station is 0;
   when the number of times of failing to continually receive a beacon signal from the master station is 0, determining, by the slave station, whether the time value during which the latest packet was received from the master station is greater than a threshold time with respect to the maximum time value during which the slave station is not obliged to exchange packets with the master station after accessing the network;
   when it is determined that the time value during which the latest packet was received from the master station is greater than the threshold time with respect to the maximum time value during which the slave station is not obliged to exchange packets with the master station after accessing the network, transmitting, by the slave station, a command indicating that the slave station has been activated, to the master station;
   determining, by the slave station, whether the time value during which the latest packet was received from the master station is greater than the maximum time value during which the slave station is not obliged to exchange packets with the master station after accessing the network, after the transmitting of a command; and
   when it is determined that the time value during which the latest packet was received from the master station is greater than the maximum time value during which the slave station is not obliged to exchange packets with the master station after accessing the network, determining, by the slave station, that there is an error with the link to the master station and notifying about disconnection to the master station.

4. The method of claim 3, wherein when the number of times of failing to continually receive a beacon signal from the master station is not 0 and the time value during which the latest packet was received from the master station is smaller than the threshold time with respect to the maximum time value during which the slave station is not obliged to exchange packets with the master station after accessing the network, a link state with the master station is determined by the slave station by determining whether the time value during which the latest packet was received from the master station is greater than the maximum time value during which the slave station is not obliged to exchange packets with the master station after accessing the network.

5. The method of claim 3, further comprising:
when the time value during which the latest packet was received from the master station is smaller than the maximum time value during which the slave station is not obliged to exchange packets with the master station after accessing the network, determining, by the slave station, whether a beacon transmission time value of the master station is greater than the maximum time value during which the slave station is not obliged to exchange packets with the master station; and
when it is determined that the beacon transmission time value of the master station is greater than the maximum time value during which the slave station is not obliged to exchange packets with the master station, determining, by the slave station, that a beacon has not been received continually from the master station for a long period of time so a link has been disconnected, and resetting an operation of the slave station.

6. The method of claim 5, further comprising:
re-connecting to a previous master station or requesting a connection to a new master station of a different channel, after the resetting of the slave station.

* * * * *